Dec. 24, 1957     S. H. RIPLEY     2,817,110

FISH KILLING TOOL

Filed April 20, 1956

INVENTOR.
STANLEY H. RIPLEY
BY

*Patrick D Beavers*
ATTORNEY

United States Patent Office 2,817,110
Patented Dec. 24, 1957

2,817,110
FISH KILLING TOOL
Stanley H. Ripley, Soap Lake, Wash.
Application April 20, 1956, Serial No. 579,652
1 Claim. (Cl. 17—7)

This invention relates to a tool which quickly and efficiently kills a fish by breaking its neck.

An object of the invention is to provide a tool for killing a fish that will eliminate bruising the body of the fish.

Another object of this invention is to provide a tool that will protect the hands of the fisherman while killing the fish.

A further object of the invention is to provide a tool that will aid the fisherman in retrieving his hook from the mouth of the fish.

With the above and other objects and advantages in view, the invention consists of the novel details of construction, arrangement and combination of parts more fully hereinafter described, claimed and illustrated in the accompanying drawing in which:

Figure 1:
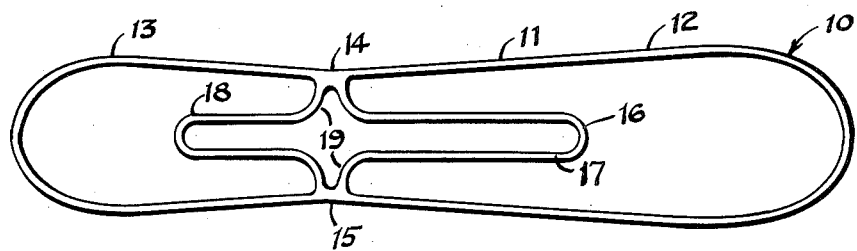
Fig. 1 is a plan view of a tool embodying the invention.
Figure 2:
Fig. 2 is a side elevational view of the tool of Fig. 1.
Figure 3:
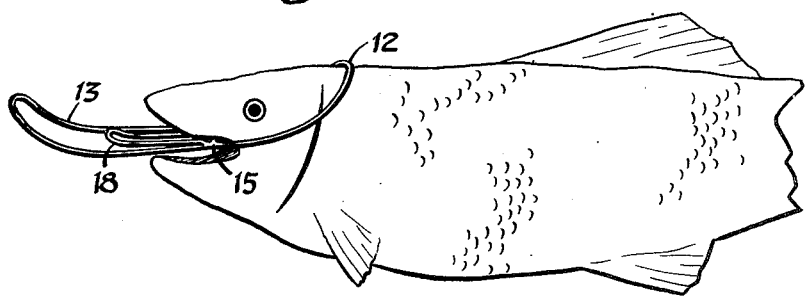
Fig. 3 is an elevational view of the tool in position in the mouth of the fish preparatory to breaking the neck of the fish.

Referring more in detail to the drawing wherein like parts are designated by like reference numerals, the reference numeral 10 is used to generally designate a tool embodying the invention.

The tool 10 is substantially oval in formation and comprises an outer body 11 formed from a single strand of heavy gauge wire. The body has an elongated loop 12 at one end and a foreshortened loop 13 at the opposite end. Viewing Fig. 1, the ends of the loops 12 and 13 meet at enlarged portions 14 and 15.

Positioned within the outer body 11 of the tool 10 is an inner body 16 which comprises an elongated loop 17 and a foreshortened loop 18. Each of the loops is made of the same gauge wire as the body 11 and each loop has its inner ends outturned as at 19 to terminate integrally with the enlarged portions 14 and 15, Fig. 1.

The body 10 is curved longitudinally from the tip of the loop 12 to the tip of the loop 13. The loop 18 of the body 16 is positioned within the loop 13 of the body 10 and is curved in similar manner to the loop 13.

The loop 17 of the body 16 is positioned within the loop 12 of the body 10 and is curved in similar manner to the loop 12.

The bodies 10 and 16 are similarly curved so that when either of the loops 17 or 18 is placed in the mouth of a fish, either of the loops 12 or 13 will rest on the back of the neck of the fish. The use of the loops depending on the size of the fish.

By using the portion of the body 10, not in engagement with the fish, as a handle, pressure is applied to the handle so that as the loop inside of the mouth of the fish presses upwardly, the loop engaging the back of the neck of the fish will press downwardly to break the neck of the fish.

In the operation of the device, the fish is held in one hand while the tool is manipulated with the other hand.

There are no moving parts in the tool and the material used is rust resistant so that it may be used for fresh or salt water fish.

There has thus been provided a tool that will efficiently and quickly break the neck of a fish, and it is believed that from the foregoing description the operation and structure of the tool will be apparent to those skilled in the art.

It is also to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

A fish killing tool comprising a relatively large substantially ovular outer body of wire, said outer body comprising an elongated loop and a foreshortened loop, enlarged portions interconnecting inner ends of said loops, and a relatively small substantially ovular inner body of wire, said inner body comprising an elongated loop extending within the elongated loop of the outer body, and a foreshortened loop extending into the foreshortened loop of the outer body, said loops of said inner body having inner ends connected to adjacent enlarged portions, said bodies each being curved longitudinally.

References Cited in the file of this patent
UNITED STATES PATENTS

| | | |
|---|---|---|
| 1,720,100 | Smith | July 9, 1929 |
| 2,644,267 | Helgeson | July 7, 1953 |